United States Patent [19]

Dallas

[11] 4,102,239
[45] Jul. 25, 1978

[54] WASHER

[76] Inventor: Charles M. Dallas, 1269 N. Pierce Ave., North Bellmore, N.Y. 11710

[21] Appl. No.: 769,446

[22] Filed: Feb. 17, 1977

[51] Int. Cl.² ............................................. F16B 43/00
[52] U.S. Cl. ..................................... 85/50 R; 151/38
[58] Field of Search .................. 85/50 R, 62; 151/38; 10/86 B

[56] References Cited

U.S. PATENT DOCUMENTS

| 551,043 | 12/1895 | Otto | 151/38 |
|---|---|---|---|
| 1,793,453 | 2/1931 | Barili | 151/38 |
| 1,911,820 | 5/1933 | Fitzgerald | 85/50 R X |
| 3,090,203 | 5/1963 | Durget | 85/50 R X |
| 3,150,556 | 9/1964 | Churchill | 151/38 X |
| 3,788,185 | 1/1974 | Gutshall | 151/38 X |

FOREIGN PATENT DOCUMENTS

| 700,874 | 1/1931 | France | 151/38 |
|---|---|---|---|
| 940,766 | 6/1948 | France | 151/38 |
| 431,183 | 7/1926 | Fed. Rep. of Germany | 85/50 R |

*Primary Examiner*—Ramon S. Britts
*Attorney, Agent, or Firm*—Robert D. Farkas

[57] ABSTRACT

An anti snag washer that is employed with a conventional screw or bolt and nut and provides for increased area of contact with the workpiece due to the combination of an inner and outer washer.

4 Claims, 3 Drawing Figures

WASHER

BACKGROUND OF THE INVENTION

This invention relates to a washer, more particularly to a type of lock washer or anti-slip washer.

The prior art teaches a variety of such type washers, for example, as disclosed in U.S. Pat. Nos. 2,275,315; 2,370,912; 2,518,399; 2,927,495; 3,315,720; 3,476,009; 3,566,738; 3,788,185; and others.

SUMMARY OF THE INVENTION

It is accordingly an object of the instant invention to provide for a new and improved washer.

It is another object to provide for one that substantially reduces slippage.

It is a further object to provide for the same at relatively little cost thereby making it generally available.

These and other objects and advantages of the invention will become more apparent from a consideration of the following detailed disclosure and claims and by reference to the accompanying drawings, in which:

Broadly speaking, the instant invention includes the provision of a washer, comprising a first portion in the form of a hollow truncated cone, one end of the cone defining a first aperture, the opposite end of the cone communicating with a disc shaped portion having a central opening, the disc having a predetermined external diameter that is larger than the cone, at its widest point, a second element adapted to be seated in the cone and including a planar base portion defining a second aperture, a pair of opposing side walls each communicating with the base portion, a pair of inclined outer walls each member of which communicates with one side wall, respectively, the second element having a predetermined width which is smaller than the internal diameter of the cone.

DETAILED DISCLOSURE

Figure 3:
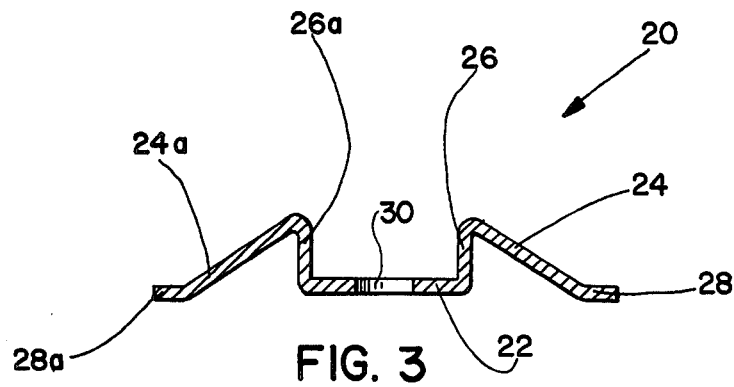
FIG. 3 is a sectional view taken along the line 3—3 of FIG. 2.
Figure 2:
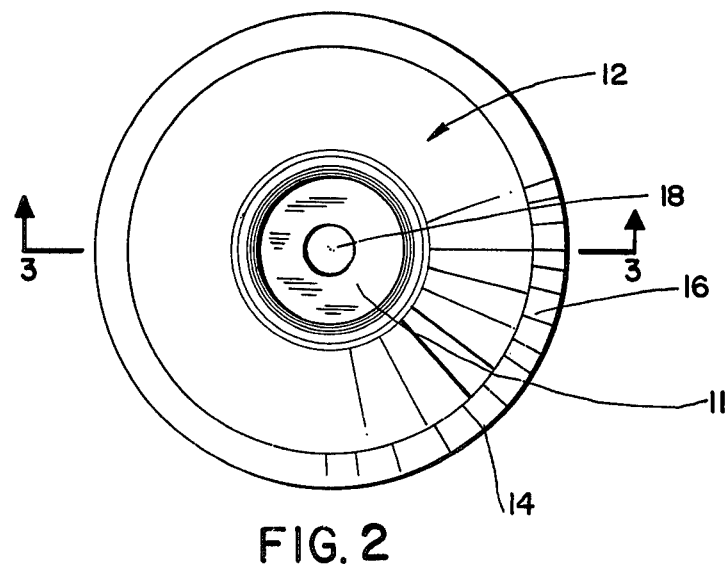
FIG. 2 is a top plan of the washer.
Figure 1:
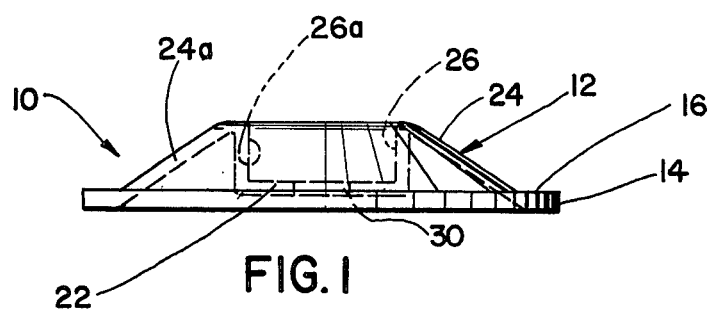
FIG. 1 is a side elevational view of the washer.

Referring more particularly to the drawings, there is shown a first or outer portion or body 10 that is in the form of a truncated cone having an annular outer wall 12 that expands outwardly to form a rim 14 or flange of a planar portion 16 about which the body 10 is seated. One end of the body 10 has a flat portion 11 which defines an aperture 18 while the opposite side bounded by only the rim 14 defines an opening therebetween into the body 10 which is hollow; the aperture 18 communicates with the opening. As is apparent from FIG. 3, the wall of the body 10 converges in one direction and does not in the opposite direction. The second element 20 of the washer includes a planar base portion 22, a pair of opposing substantially parallel side walls 26, 26a each having an inclined portion 24, 24a communicating therewith, each inclined portion 24, 24a having its distal end 28, 28a being substantially parallel to and in planar alignment with the portion 22. The portion 22 defines an aperture 30. Element 20 has an external diameter that is smaller than the internal diameter of body 10 such that the former can be inscribed into and be seated in the hollow cavity of the latter; the foregoing seating provides for axial alignment of apertures 18 and 30. When element 20 is seated in body 10, the portion 22 contacts and preferably is parallel to the workpiece as is the planar portion 16 which is likewise parallel to portion 22. Portion 16 is in essence a disc upon which the truncated cone is seated, the latter having at its widest point an external diameter smaller than that of portion 16.

It should be noted that portions 26, 26a are perpendicular to portion 22, portion 24, 24a generally communicates with portions 26, 26a, respectively, at an angle of about 45° and the entire element is constructed of a rigid substance as is the body 10, i.e., steel, etc.

Since it is obvious that numerous changes and modifications can be made in the above-described details without departing from the spirit and nature of the invention, it is to be understood that all such changes and modifications are included within the scope of the invention.

I claim:

1. A washer assembly, comprising a first outer portion in the form of a hollow truncated right angle cone, the apex of said cone defining a first aperture, the widest end of said cone fixedly secured to a first flat disc shaped member having a first central opening, said widest end located at the marginal edges defining said first central opening, a second element adapted to be seated in said cone and including a second flat disc shaped member having a second central opening therein, said first aperture residing in a plane parallel to said first disc shaped member, a cylindrically shaped tubular member having one end thereof fixedly secured to the marginal edges of said cone defining said aperture, the other end of said tubular member fixedly secured to the outermost marginal edges of said second flat disc shaped member, said second flat disc shaped member being disposed intermediate said apex end and said widest end of said cone.

2. The washer as defined in claim 1, wherein said tubular member is substantially perpendicular to said second disc shaped member.

3. The washer as defined in claim 1, wherein said outer walls communicate with said side walls at an angle of about 45°.

4. The washer as defined in claim 1, wherein said first aperture and said first central opening and said second central opening are axially aligned.

* * * * *